(12) United States Patent
Srinivasan et al.

(10) Patent No.: US 7,742,555 B1
(45) Date of Patent: Jun. 22, 2010

(54) ENHANCED STEAM DUMP (BYPASS) CONTROL SYSTEM

(75) Inventors: Seenu J. Srinivasan, Murrysville, PA (US); Rachel R. Marangoni, Monroeville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 12/172,688

(22) Filed: Jul. 14, 2008

Related U.S. Application Data

(60) Provisional application No. 60/949,554, filed on Jul. 13, 2007.

(51) Int. Cl.
*G21C 7/36* (2006.01)

(52) U.S. Cl. ............... 376/216; 376/241; 376/214; 376/207

(58) Field of Classification Search ......... 376/215–218, 376/236, 241, 242, 244
See application file for complete search history.

(56) References Cited

U.S. PATENT DOCUMENTS

| | | | |
|---|---|---|---|
| 3,930,937 A | 1/1976 | Torres | |
| 4,707,324 A | 11/1987 | Storrick | |
| 4,728,481 A | 3/1988 | Geets | |
| 4,975,238 A | 12/1990 | Regan et al. | |
| 6,886,502 B1 | 5/2005 | Srinivasan | |
| 7,120,218 B2 | 10/2006 | Srinivasan | |

*Primary Examiner*—Rick Palabrica

(57) ABSTRACT

The present invention relates to a method of controlling a nuclear reactor during a transient period. The method includes actuating the steam dump system in response to a temperature error signal and a power mismatch signal.

8 Claims, 5 Drawing Sheets

ENHANCED STEAM DUMP (BYPASS) CONTROL SYSTEM

This patent application claims priority to Provisional Patent Application No. 60/949,554, filed on Jul. 13, 2007.

BACKGROUND OF THE INVENTION

1. Field of the Invention

The present invention relates to a method of controlling a nuclear reactor during a transient period. The method includes actuating the steam dump (bypass) system in response to a temperature error signal and a power mismatch signal.

2. Description of the Prior Art

In commercial PWRs that are utilized to generate electrical power, reactor coolant water (or primary water) recirculates between a reactor pressure vessel and one of a plurality of in-parallel steam generators in a closed loop known as a reactor coolant system (or a primary system). In a steam generator, the heat in the recirculating primary water flowing through the primary side (i.e., the tube side) passes through the walls of the tubes and is absorbed by relatively cool secondary water flowing on the secondary side (or shell side). The transferred heat generates steam on the secondary side at a temperature of about 500° F. or more and at a pressure of about 800 psi or more. The steam flows out of the steam generators to turbines that generate the electrical power. The exhaust steam from the turbines is condensed and recirculated to the steam generators as feedwater.

An increase in reactor power can increase the rate of heat transfer to the reactor coolant water which can increase the rate of heat transfer to the secondary water causing more steam supplied to the turbine for transformation into electrical power. Conversely, if less electrical power is required, the power requirement of the turbine diminishes. The steam flow to the turbine is reduced and the turbine utilizes less of the steam being transferred to the secondary water. Since less steam is being drawn from the secondary side when the steam flow is reduced, both the temperature and pressure of the steam generator secondary side can increase. The effect of this increase in secondary water temperature is reflected in the reactor coolant water since less heat can be transferred from the primary water to the secondary water in the steam generator. As a result, both the temperature and pressure of the reactor coolant water can increase.

A decrease in turbine power over a period of time is referred to in the art as a load rejection. If the load rejection is such that the reactor regulating systems, like the rod control system and the steam dump system, are unable to compensate rapidly enough for the change in power and, the temperature and pressure of the primary water increases uncontrollably, protective systems come into operation to trip the reactor and/or to open steam safety valves to avoid an overpressurization in the primary and secondary systems.

The steam dump valves operate in conjunction with the turbine and the reactor to enable the prevention of excessive pressures in the primary and secondary systems, thereby allowing the reactor to stay operational in a partial or even a complete load rejection transient. The steam dump valves operate to remove excess steam from the system. The steam dump valves can be actuated when the reactor coolant average temperature (Tavg) exceeds an established setpoint or reference temperature.

A load rejection can be initiated by the operator or by an automatic signal. A 50% load rejection is a design basis requirement for commercial PWRs. In this situation, the turbine power is reduced from 100% power to 50% power; and the nuclear power, i.e., the power generated by the reactor pressure vessel, initially remains at 100%. Since the nuclear power is greater than the turbine power, the reactor coolant average temperature and pressure will increase. The rod control system will insert the rods to reduce the nuclear power; however, it will take some time to reduce the nuclear power. Thus, opening of the steam dump valves can quickly dissipate the additional nuclear power thereby slowing or precluding the increases in reactor coolant water temperature and pressure.

There are some nuclear plants that have implemented variable temperature operation at 100% power which means that the plants are operating at a reactor coolant average temperature (Tavg) that is lower than the typical value. Operation at a lower Tavg can reduce the steam dump capacity and thus, can limit the capability of a plant to sustain load rejection transients. When plants are operating at a lower Tavg, the nominal steam pressure is lower. This lower steam pressure can reduce the steam dump capacity at early stages of the transient. Currently, this may be addressed by revising the deadband and proportional band of the steam dump controller. One disadvantage to this solution is that it introduces primary and secondary side parameter fluctuations.

Thus, there is room for improvement in the art to provide a method of controlling a nuclear reactor during a transient, the nuclear reactor being operated at a lower reactor coolant average temperature, while maintaining the capacity of the steam dump system to provide rapid and early relief to avoid a reactor trip in order to improve plant operability.

SUMMARY OF THE INVENTION

As one aspect of the present invention, a method is provided for controlling a nuclear reactor during a transient. The method includes generating a first temperature error signal based on the amount by which reactor coolant average temperature exceeds a reference temperature; generating a second temperature error signal based on a power error signal provided when turbine power is reduced and the power of the turbine changes relative to the power of the nuclear reactor at a rate that exceeds a preselected rate; summing the temperature error signals to generate a valve control signal; and actuating the steam dump system in response to the valve control signal. As another aspect of the present invention, a steam dump control system is provided for controlling the response of a nuclear reactor to a transient. The steam dump control system includes at least one steam dump valve having a positioner operable to open the valve. Further included, is a coolant sensor system for monitoring an average temperature of a coolant of the nuclear reactor and providing a temperature error signal when the average temperature of the coolant exceeds a reference temperature; a nuclear power plant power sensing system for monitoring the power of the reactor and the power of a turbine which is driven by the power of the reactor and providing a power error signal when the turbine power is reduced and the power of the turbine changes relative to the power of the reactor at a rate that exceeds a preselected rate; and a control means having an input from the coolant sensor system and the nuclear power plant power sensing system for combining the temperature error signal and the power error signal to produce a valve control signal to control said valve positioner.

In still another aspect of the present invention, a method is provided for dissipating steam from the secondary side of a steam generator in a nuclear reactor. The method includes monitoring the nuclear reactor power and turbine power;

monitoring the reactor coolant average temperature and a reference temperature; generating a power error signal when the turbine power is reduced and the power of the turbine changes relative to the power of the reactor at a rate that exceeds a preselected rate; generating an error based on the reactor coolant average temperature and the reference temperature; summing the errors to generate a valve control signal to open at least one steam dump valve to dissipate the steam.

BRIEF DESCRIPTION OF THE DRAWINGS

The invention as set forth in the claims will become more apparent from the following detailed description of certain preferred practices thereof illustrated, by way of example only, and the accompanying drawings wherein;

DESCRIPTION OF THE PREFERRED EMBODIMENTS

Figure 1:
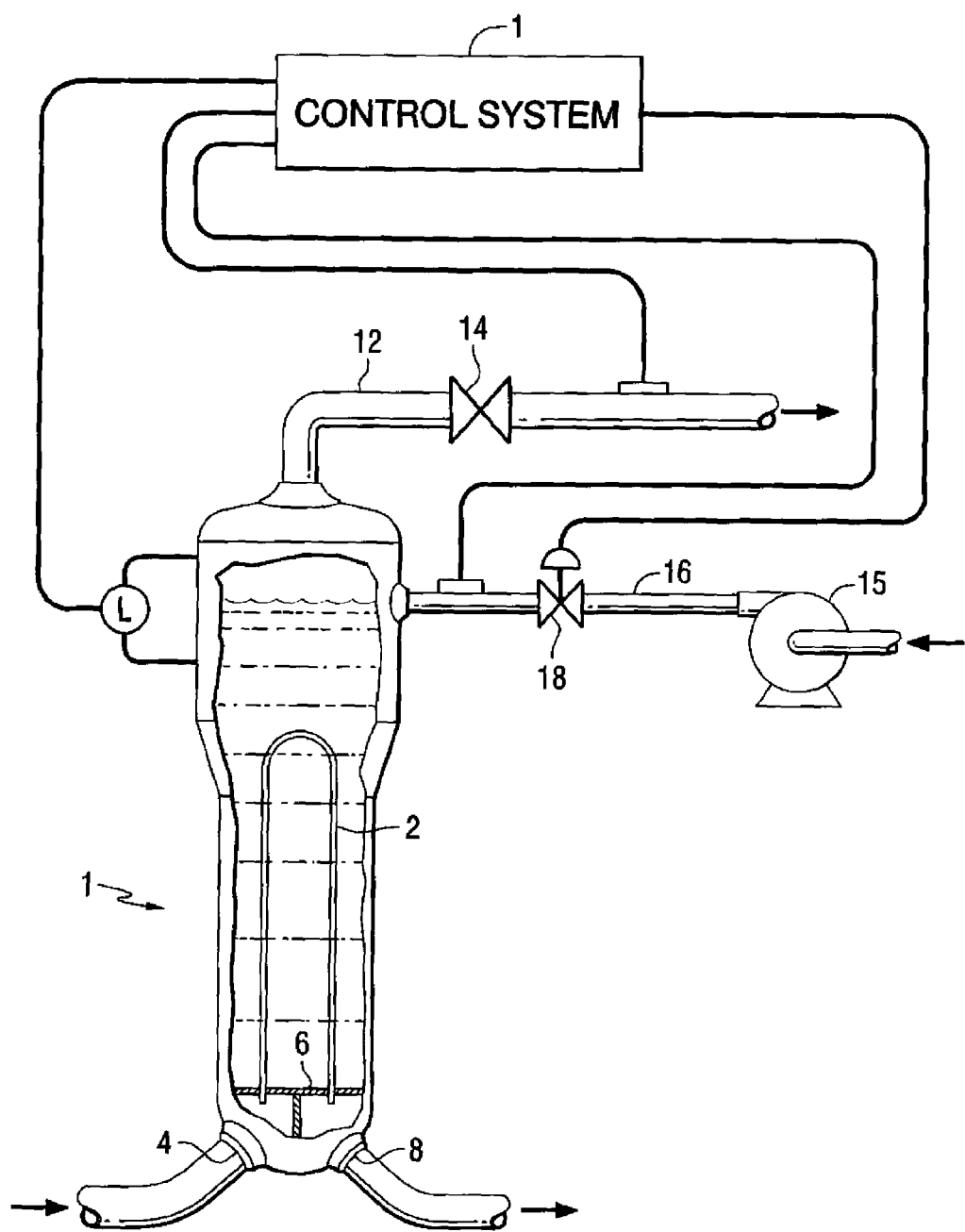
FIG. 1 is a schematic diagram representation of a commercial PWR steam generator.

It is an object of the present invention to provide a method for controlling a nuclear reactor during a transient by introducing a temperature error signal proportional to a power mismatch (between the nuclear reactor power and the turbine power) in addition to a temperature error signal based on Tavg (and Tref) to actuate the steam dump system in response to the combined temperature error signals.

In commercialized PWRs for nuclear power generation, it is known for the steam dump valves in the steam dump system to open due to the actual reactor coolant average temperature (Tavg) exceeding an established reference temperature setpoint (Tref). The amount by which Tavg exceeds Tref is referred to as a temperature error. However, when a nuclear plant is operating at a lower Tavg, the Tref may not be exceeded at the initial onset or early stages of a transient such as a load rejection transient. Thus, a signal to open the steam dump valves in order to dissipate the additional nuclear power will not be generated and the valves will not open during the these initial or early stages of the transient. As a result of the steam dump valves not opening and the additional nuclear power not being dissipated, continued operability of the nuclear plant could be jeopardized.

In the present invention, the steam dump system is actuated and the steam dump valves opened based on a combination of a temperature error based on a rate of power mismatch and a temperature error based on Tavg. As used herein and the claims, the term "rate" when used to describe a power mismatch or turbine power relative to nuclear reactor power, refers to a change in turbine power (e.g., when the turbine power is reduced) over a specified or preselected time period.

For example, when the turbine is operating at 50% power and the reactor pressure vessel is generating 100% power, the nuclear power exceeds the turbine power 50%, e.g., the power mismatch is 50%. Depending on the time period during which the reduction in turbine power occurs, a temperature error based on the power mismatch may be generated.

The steam dump valves will be armed (e.g., ready to operate) when the turbine power is reduced based on the change in turbine power relative to the nuclear reactor power at a rate that exceeds a specified or preselected rate. For example, at some nuclear plants, the steam dump valves are armed when the turbine power step decreases at least 10% over a specified time period. This feature is referred to as interlock and precludes the steam dump valves from opening unnecessarily. This interlock criterion is plant specific and thus, can vary from one nuclear plant to another.

Further, in a hypothetical transient where the turbine is operating at 100% power and the reactor pressure vessel is generating 50% power, the nuclear power does not exceed the turbine power and therefore, a temperature error based on power mismatch will not be generated.

The nuclear reactor power is measured using ex-core detectors located outside the reactor pressure vessel. "Nuclear reactor power" is also referred to herein as "nuclear power" or "reactor power". The nuclear reactor power is expressed as a percentage value. The turbine power is determined by measuring the steam pressure in the impulse chamber of the turbine. The turbine impulse pressure value can be correlated with or correspond to a percent power value. For example, a turbine impulse pressure of 800 psi corresponds to a turbine power of 100% and, a turbine impulse pressure of 400 psi corresponds to a turbine power of 50%.

As used herein and the claims, the terms "steam dump system" and "steam dump control system" can also be referred to as "steam bypass system" and "steam bypass control system", respectively. Further, the use of the term "steam dump valves" refers to the steam dump valves typically located in the steam dump valve system and/or steam dump control system of a PWR, and can include condenser steam dump valves or atmospheric steam dump valves.

A temperature error based solely on the difference between Tavg and Tref is conventionally used to generate an error signal to open the steam dump valves (as previously discussed herein). A nuclear plant can include a coolant sensor system for monitoring an average temperature of a coolant of the nuclear reactor and providing a temperature error signal when the average temperature of the coolant exceeds a reference temperature.

In the present invention, the combination, e.g., summation, of the temperature errors based on both power mismatch and Tavg is used to generate a signal, such as a valve control signal, to actuate the steam dump system to open steam dump valves rapidly and early to dissipate steam in response to a transient such as load rejection. Each steam dump valve can include a positioner operable to open the valve in response to a valve control signal. Further, a nuclear plant can include a power sensing system for monitoring the power of the reactor and the power of a turbine which is driven by the power of the reactor and providing a power error signal when the turbine power is reduced and the power of the turbine changes relative to the power of the reactor at a rate that exceeds a preselected rate. The nuclear plant can also include a control means having an input from the coolant sensor system and the nuclear power plant power sensing system for combining the temperature error signal and the power error signal to produce a valve control signal to control said valve positioner.

Referring to the drawings in detail and in particular to FIG. 1, there is shown a steam generator 1 in a commercial pressurized water reactor (PWR) with a control system that may be employed in a preferred practice of the present invention when the PWR is generating power. The steam generator 1 has thousands of small diameter tubes in a tube bundle represented by tube 2, which may be U tubes extending above a tube sheet 6 as shown or straight tubes extending between two tube sheets. The primary water from the reactor pressure vessel (not shown) flows into the primary side of the steam generator 1 through an inlet nozzle 4 in a lower hemispherical head, through the tubes 2 in the tube sheet, out of the steam generator 1 through an outlet nozzle 8 and back to the reactor pressure vessel. On the secondary side of the steam generator 1, steam is generated and flows out through steam line 12 and main steam valve 14 to turbines (not shown) for generating electrical power. The low pressure steam exhausted from the turbines is condensed and then pumped back to the steam generator 1 by a main feedwater pump 15 through a feedwater water line 16.

In the practice of the present invention, selected process variables around the secondary side of the steam generator 1 are monitored. Such sensors may be electrical resistance level indicators, venturi meters, ultrasonic flow meters and the like. Sensors (not shown) may be employed to monitor process variables such as the turbine impulse pressure. Transducers (not shown) may be employed to send process signals based upon the sensed process variables to a control system 17.

Figure 2:
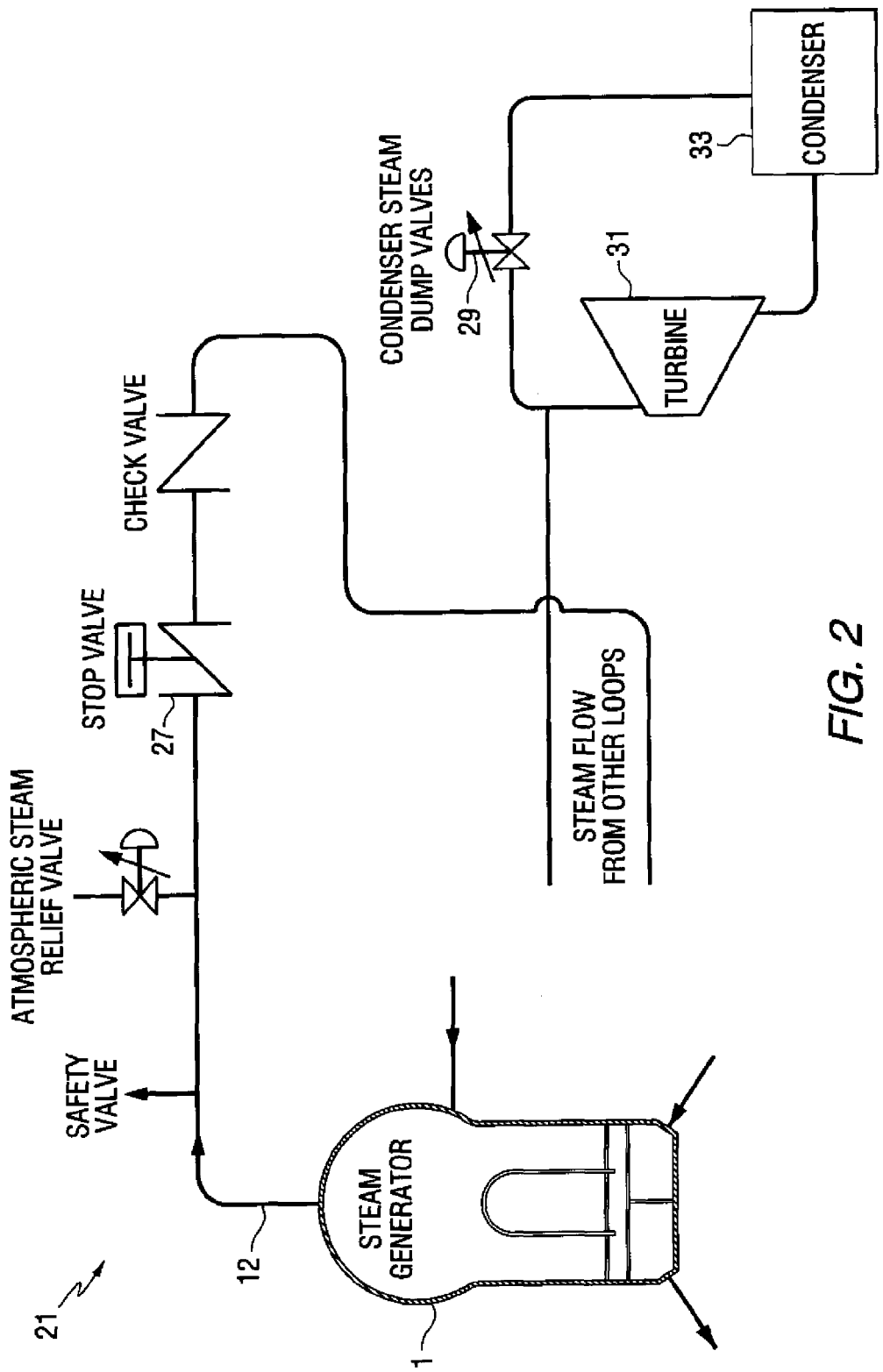
FIG. 2 is a schematic diagram representation of a Steam Dump System.

Referring to FIG. 2, the steam dump system 21 is comprised of four banks of valves. The steam line 12 which exits from steam generator 1 can be delivered as input to the turbine 31. Alternatively, the valves can bypass the steam line 12 from the turbine 31 to the condenser 33. These valves have a total capacity of typically forty percent (40%) of the full load turbine steam flow at full load steam pressure. The valves receive flow from the steam line 12 downstream of the main steam stop valves 27. The steam dump valves, such as the condenser steam dump valves 29 and atmospheric steam dump valves (not shown), have two modes of operation, i.e., (i) load rejection and (ii) reactor trip.

In response to a reactor trip signal, all steam dump valves may fully open essentially immediately to dissipate steam. The reactor is brought to no-load conditions. The steam dump valves open based on the difference between Tavg and T-no-load. Based on the magnitude of this temperature error the steam dump valves may trip open or modulate open. This mode of operation is conventional in the art.

In response to a load rejection transient, the position to which the valves are opened (i.e., partially or fully) and how rapidly (immediately or slower) the valves are opened can depend on the magnitude of the temperature error signal generated. Conventionally, the temperature error is based on Tavg only. In the present invention, the total temperature error is based on Tavg and on power mismatch. A load rejection controller is provided having a dead-band and a proportional band. A dead-band magnitude can be, for example, 2 to 5 degrees. If the temperature error is less than the magnitude of deadband, the steam dump valves will not open. The proportional error magnitude varies from plant to plant and depends on the nominal Tavg at 100% power and the no-load Tavg. For example, at some nuclear plants, the proportional temperature error can be 16 degrees and may control four banks of steam dumps. If the deadband in this example is 2 degrees, and if the temperature error exceeds 18 degrees, all (four banks) of the steam dump valves will fully open essentially immediately. The temperature at which the steam dump valves fully open essentially immediately can be referred to as a trip open setpoint. However, if the total temperature error is only 6 degrees, the first bank of valves may trip open from 0% to 100% over a period of three seconds. If, for instance, the total temperature error is only 4 degrees, the first bank of valves may open to only 50% of full open over a time period of ten seconds. Further, if for instance, the total temperature error was 8 degrees, the first bank of valves may fully open within 3 seconds and the second bank will open to a position of 50% full open over a period of 10 seconds. The trip open setpoints specified herein are provided herein for illustrative purposes only. The trip open setpoints are determined on a plant specific basis and thus, can vary from one nuclear plant to another. Further, the number of banks of steam dump valves is plant specific and therefore, can also vary amongst various nuclear plants.

In the load rejection mode of operation, a modulate signal is sent to the valve positioner and the dump valve position depends upon the magnitude of the modulate signal. The dump valves are typically modulated one bank at a time. For example, when a nuclear plant has four banks of valves, the second bank does not begin to modulate open until the first bank has received a signal to modulate full open. The sequence for modulating the valves closed is the reverse of the opening sequence. For example, the fourth bank to open is the first bank to close, and the third bank starts to close after the fourth bank has received a signal to close. The first bank to modulate open is also the first bank to be tripped open. The second bank to modulate open is the second bank to trip open. The valves in the first bank can be designated as the cooldown dump valves.

In the present invention, the temperature error used to open the steam dump valves can be increased due to the temperature error being generated based on power mismatch in addition to the conventional temperature error based on Tavg. Thus, as a result of the total temperature error, the steam dump valves can open earlier and more fully during a load rejection transient to provide increased steam relief capacity early in the transient as compared with the conventional Tavg temperature error generated.

The steam dump control system can allow a nuclear plant to accept a sudden 50 percent loss of load without incurring reactor trip. Conventionally, in response to such a loss of load, the nuclear power has been reduced by inserting the rods and using the steam dump valves to remove excess energy. Based on the value of Tavg and Tref, the steam dump valves remove stored energy and residual heat following a load rejection and along with the rod control system bring the plant to an equilibrium condition without actuation of the steam generator safety valves or reactor trip. Various interlocks minimize any possibility of an inadvertent actuation of the steam dump valves.

Figure 3:
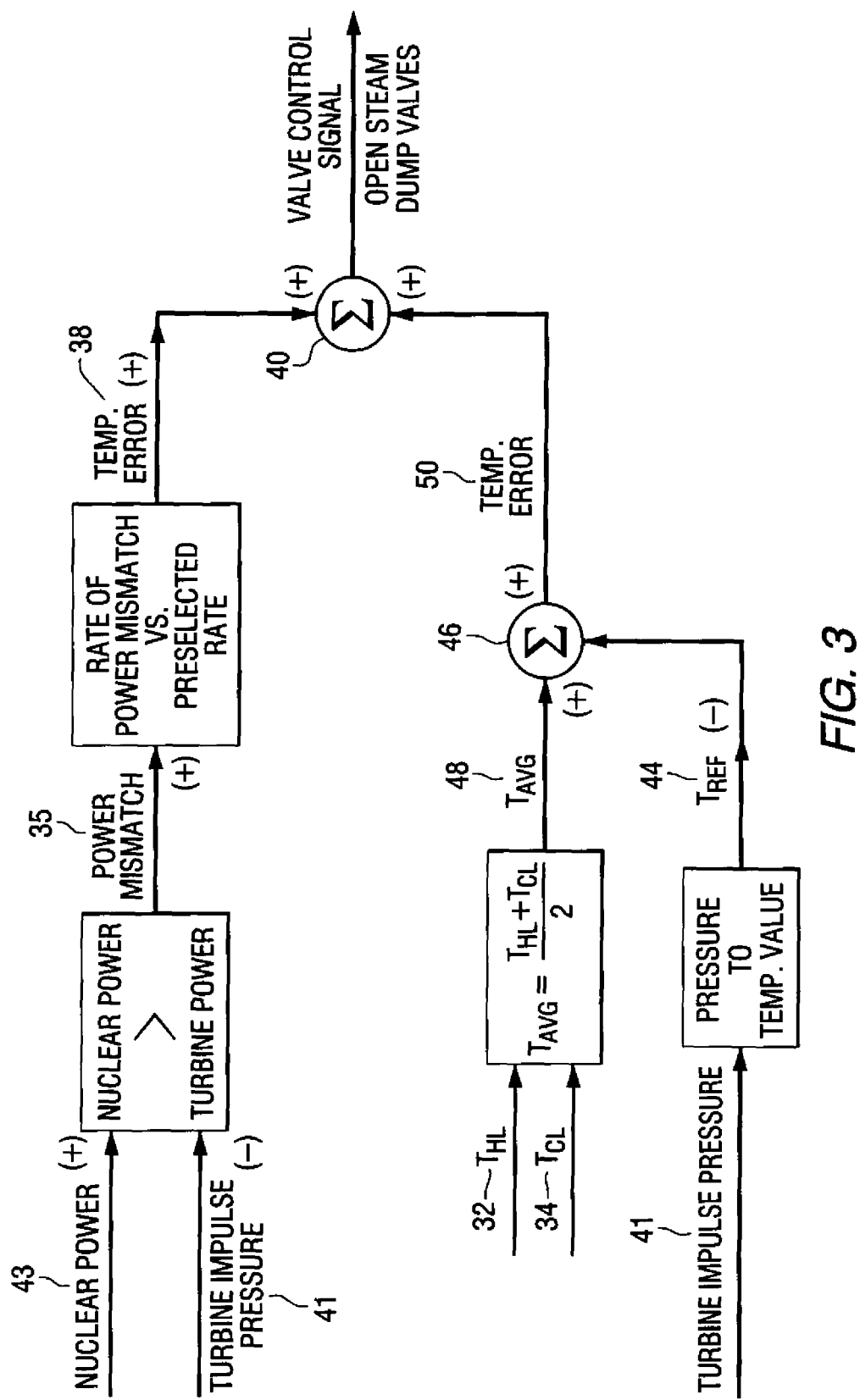
FIG. 3 is a schematic flow chart representation of an embodiment of the present invention of a Steam Dump Control System.

Referring to FIG. 3, there is provided a schematic flow diagram showing the determination and utilization of a temperature error based on power mismatch over time and a temperature error based on Tavg, to open the steam dump valves in response to initiation of a transient such as load rejection. A turbine impulse pressure measurement 41 and a nuclear power measurement 43 are used to determine if a power mismatch 35, e.g., loss of load, has occurred. As previously indicated, the turbine impulse pressure 41 is derived from the steam pressure measured in the impulse chamber of the turbine, and nuclear power 43 is measured using ex-core detectors located outside the reactor pressure vessel. The turbine impulse pressure 41 corresponds to a turbine power value. The turbine power is subtracted from the nuclear power 43. If there is a negative (−) result such that the turbine power exceeds the nuclear power 43, no temperature error based on power mismatch is generated. However, if there is a positive (+) result such that the nuclear power 43 exceeds the turbine power, and depending on the length of time over which the turbine power 41 is reduced (e.g., the rate at which the turbine power 41 changes relative to the nuclear power 43 compared to a preselected rate), a temperature error 38 based on power mismatch 35 may be generated. A percent turbine reduction per time is representative of a specific temperature error. The temperature error corresponding to the power/time value is determined on a plant specific basis and therefore, varies from one plant to another. The correlation between power/time and temperature error is determine based on the configuration of a certain plant thus, often times involves analysis and modeling of the nuclear plant. For example, as an illustration only, for a 50% load rejection whereby the turbine power decreases by 50% over a time period of fifteen seconds, the power error (e.g., gain) could be adjusted to yield a temperature error 38 of 16 degrees.

Also in FIG. 3, the hot leg temperature ($T_{HL}$) 32 and the cold leg temperature ($T_{CL}$) 34 are measured and input to calculate Tavg 48. Turbine impulse pressure 41 is used to determine a Tref value 44. The Tavg 48 and the Tref 44 are combined in the summator 46 wherein Tref 44 is subtracted from Tavg 48. If the temperature difference is positive (+) such that Tavg 48 exceeds Tref 44, a temperature error 50 is generated. If the temperature difference is negative (−) such that Tref 44 exceeds Tavg 48, a temperature error is not generated. The temperature error 50 is representative of the amount by which Tavg 48 exceeds Tref 44. The temperature error 50 (based on Tavg and Tref) and the power mismatch temperature error 38 (based on the nuclear and turbine power) are added in summator 40. The resultant temperature error is used to generate a signal, such as a valve control signal, which enables actuation of the steam dump system and opening of the steam dump valves early and rapidly so that the steam build-up in the secondary side can be dissipated.

Figure 4:
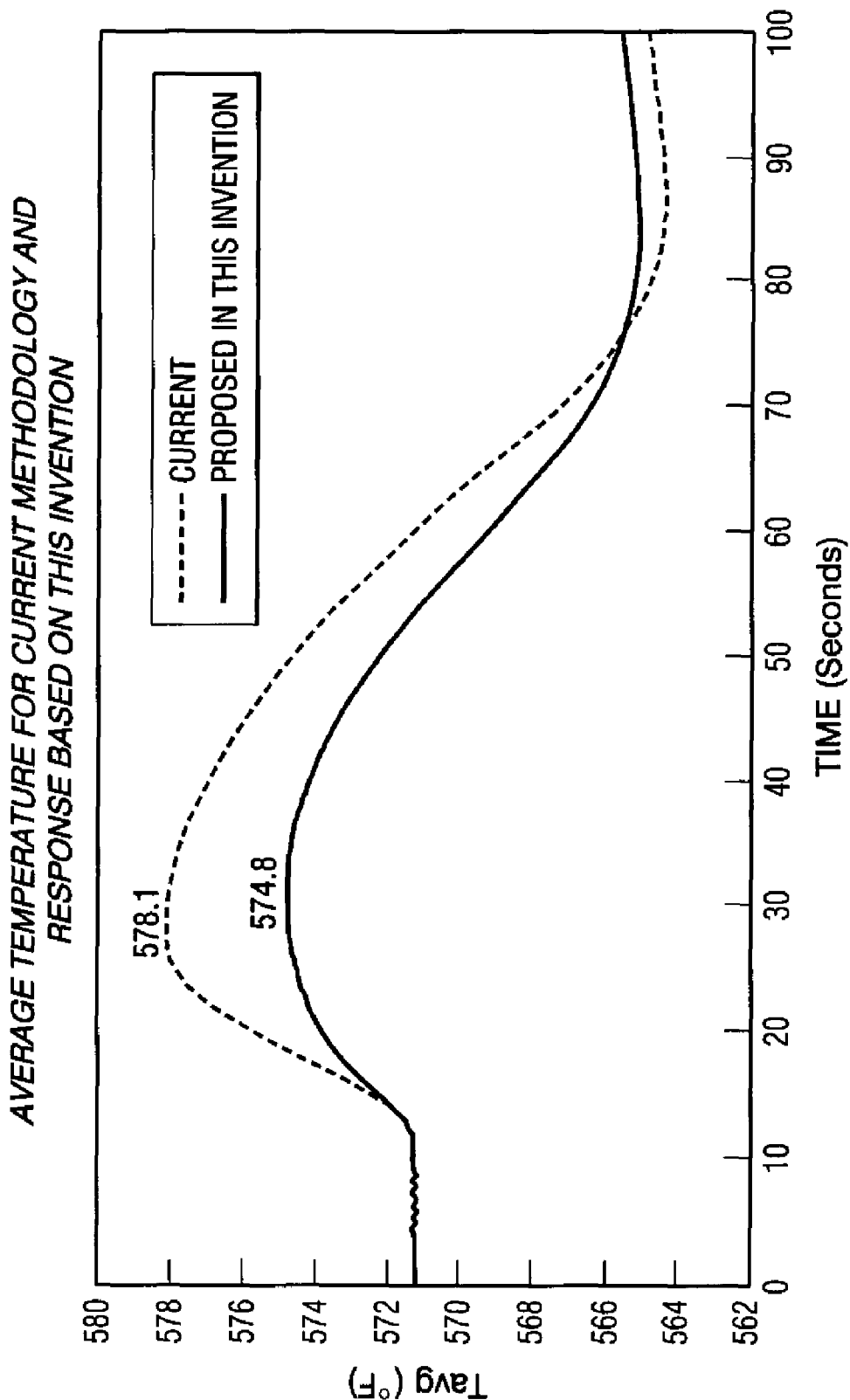
FIG. 4 is a graphical representation of an example comparison of the average temperature during a load rejection transient resulting from the method of the present invention shown in solid line drawing, compared to the prior art method shown in dotted line.

The use of the power mismatch temperature error in addition to the Tavg temperature error, allows the steam dump valves to open at a lower Tavg than if only the Tavg temperature error was used (i.e., without the power mismatch temperature error). As shown in FIG. 4, Tavg will increase during a load rejection. For example, the load rejection can include a reduction in turbine power from 100% to 50%, and while the nuclear power remains initially at 100%. Since the reactor power exceeds the turbine power, the Tavg will increase. The rod control system will insert the rods to reduce the nuclear power based on the amount by which Tavg exceeds Tref. However, since it will take a period of time for the rods to mitigate the loss of load and reduce the nuclear power, the extra power may be dissipated by opening the steam dump valves. The opening of the steam dump valves minimizes the increase of Tavg. As shown in FIG. 4, Tavg increases to a maximum of 578.1° F. with the prior art steam dump system operation such that the steam dump valves open based only on a temperature error between Tavg and Tref. Further, in FIG. 4, it is shown that Tavg increases to a maximum of 574.8° F. with the steam dump system operation in accordance with the present invention such that the steam dump valves open based on a power mismatch temperature error in addition to the Tavg temperature error. The lower Tavg temperature increase provides operating margin and will not imitate a trip function that is based on Tavg.

Figure 5:
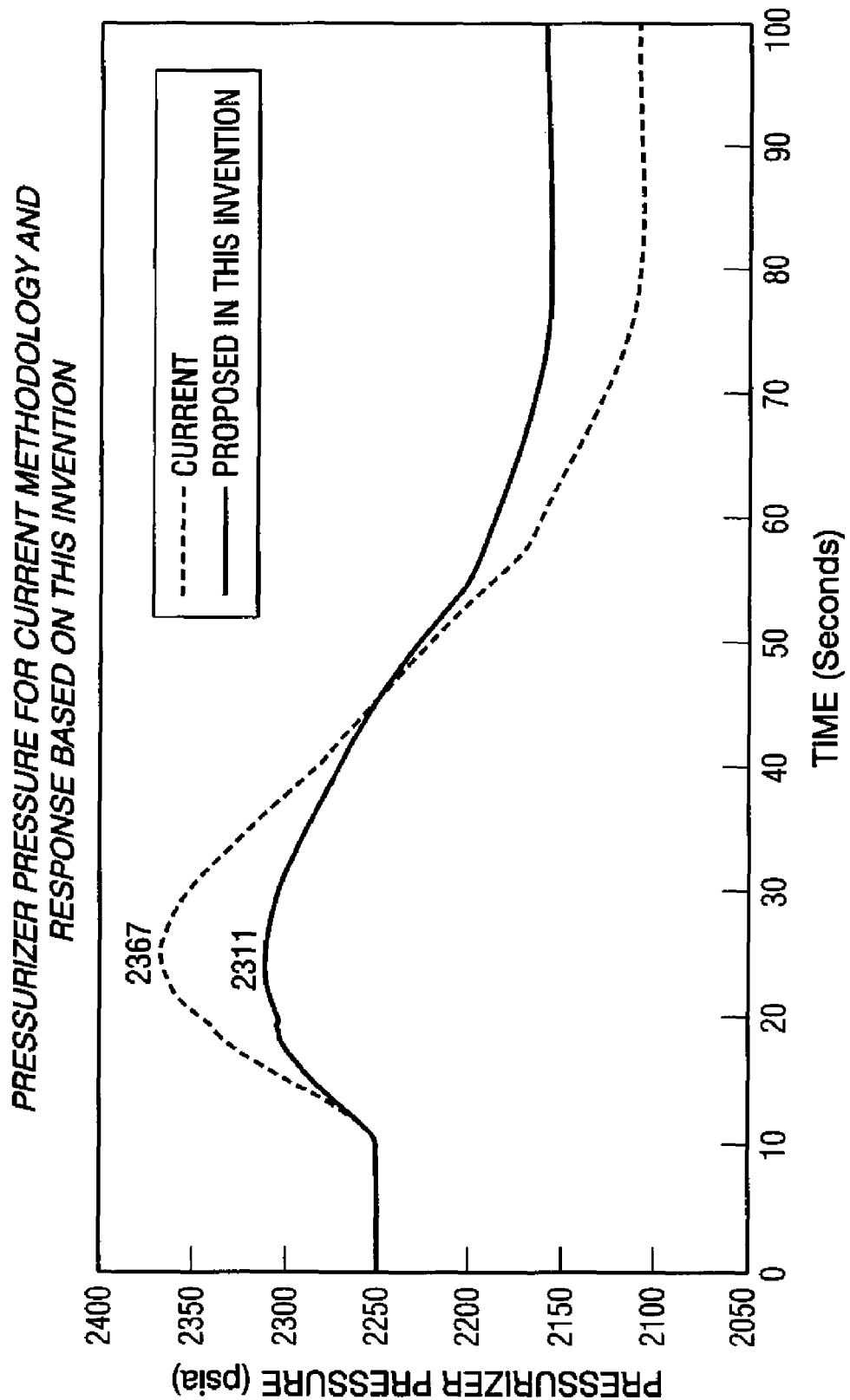
FIG. 5 is a graphical representation of an example comparison of the pressurizer pressure during a load rejection transient resulting from the method of the present invention shown in solid line drawing, compared to the prior art method shown in dotted line.

As shown in FIG. 5, the reactor coolant system pressure will increase during a load rejection. The load rejection can cause the turbine to reduce power such as from 100% to 50%, while the nuclear power remains initially at 100%. Since the reactor power exceeds the turbine power, the pressure of the reactor coolant system will increase. As previously indicated, the rod control system will insert the rods to reduce the nuclear power but it will take a period of time for the rods to mitigate the loss of load and reduce the nuclear power, thus, the extra power may be dissipated quickly by opening the steam dump valves. The opening of the steam dump valves minimizes the reactor pressure increase. In FIG. 5, the reactor coolant pressure increases to a maximum of 2367 psia with the prior art steam dump system operation such that the steam dump valves open based only on a temperature error between Tavg and Tref. Further, in FIG. 5 it is shown that the reactor coolant pressure increases to a maximum of 2311 psia with the steam dump system operation in accordance with the present invention such that the steam dump valves open based on a power mismatch temperature error in addition to the Tavg temperature error. The lower pressure increase provides operational margin since the opening of the steam dump valves precludes the need for the pressure relief/steam safety valves to open.

In the present invention, the summation of the power mismatch error and temperature error is used to open the steam dump valves. Typically, the opening (and closing) of the valves is modulated through the valve positioners. The steam dump valves are not opened unless the condenser is available, i.e., unless a vacuum exists and circulating water is available. The air supplied to the steam dump valves is blocked on high condenser pressure or loss of all circulating water.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of controlling a nuclear reactor during a load rejection transient, the nuclear reactor including a Reactor Coolant System having a hot leg with a temperature, $T_{hot}$, and a cold leg with a temperature, $T_{cold}$, a turbine having an impulse chamber and a steam dump system having steam dump valves, comprising the steps of:

generating a first temperature error signal based on an amount by which a reactor coolant average temperature exceeds a reference temperature, said reactor coolant average temperature determined from an average of $T_{hot}$ and $T_{cold}$, and said reference temperature determined from a pressure measured in the impulse chamber of the turbine;

generating a second temperature error signal based on a power error signal provided when power level of the turbine is reduced and power level of the reactor exceeds the power level of the turbine;

summing said temperature error signals to generate a valve control signal for the steam dump valves;

actuating the steam dump system in response to said valve control signal.

2. The method of claim 1 wherein said turbine power is based on steam pressure measured inside the impulse chamber of the turbine.

3. The method of claim 1 wherein said load rejection is about fifty percent (50%).

4. The method of claim 1 wherein said valve control signal controls a valve positioner.

5. The method of claim 4 wherein said valve positioner enables opening of steam dump valves in said steam dump system.

6. The method of claim 5 wherein said steam dump valves are selected from the group consisting of condenser dump valves and atmospheric steam dump valves.

7. The method of claim 5 wherein said steam dump valves comprise at least four banks of valves.

8. The method of claim 1 further comprising converting said power mismatch error signal into a temperature error signal.

* * * * *